(12) United States Patent
Fasen (10) Patent No.: US 6,747,863 B2
(45) Date of Patent: Jun. 8, 2004

(54) ELECTROSTATIC DRIVE

(75) Inventor: Donald J. Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 254 days.

(21) Appl. No.: 10/043,971

(22) Filed: Jan. 11, 2002

(65) Prior Publication Data

US 2003/0133252 A1 Jul. 17, 2003

(51) Int. Cl.[7] .................................................. H01G 7/00
(52) U.S. Cl. ...................... 361/277; 361/272; 361/278; 361/280; 361/292; 361/298.1
(58) Field of Search ................................ 361/277, 272, 361/278, 290–293, 233, 234, 280, 287, 297, 298, 298.1, 279, 281, 283

(56) References Cited

U.S. PATENT DOCUMENTS

| | | | |
|---|---|---|---|
| 3,968,416 A | 7/1976 | Leenhouts | |
| 4,121,145 A | 10/1978 | Talmadge | |
| 4,490,664 A | 12/1984 | Moriguchi | |
| 5,557,596 A | 9/1996 | Gibson et al. | 369/101 |
| 6,373,682 B1 * | 4/2002 | Goodwin-Johansson | 361/278 |
| 6,437,965 B1 * | 8/2002 | Adkins et al. | 361/303 |
| 6,496,351 B2 * | 12/2002 | Hill et al. | 361/278 |
| 6,549,394 B1 * | 4/2003 | Williams | 361/281 |
| 6,600,644 B1 * | 7/2003 | Chiou et al. | 361/292 |
| 6,625,004 B1 * | 9/2003 | Musolf et al. | 361/278 |

FOREIGN PATENT DOCUMENTS

| | | |
|---|---|---|
| EP | 0865151 | 9/1998 |
| EP | 1139553 | 10/2001 |
| WO | WO 00/28651 | 5/2000 |

* cited by examiner

Primary Examiner—Anthony Dinkins
Assistant Examiner—Nguyen T. Ha (57) ABSTRACT

An electrostatic drive having a plurality of mover electrodes operatively secured to a mover, and a plurality of stator electrodes operatively secured to a stator. The mover and stator are configured to move relative to each other via electrostatic force generated between the mover electrodes and the stator electrodes. The electrostatic drive includes a driver configured to place the stator electrodes in any of a number of sequential voltage states, each being defined by a combination of LO and HI voltage levels at the individual stator electrodes. Transition from one voltage state to a sequentially adjacent voltage state produces a step size of relative movement between the mover and stator. For each of the sequential voltage states, the driver is further configured to selectively vary voltage applied at one of the stator electrodes to an amount between the LO and the HI voltage levels, in order to produce a proportionally smaller step size.

22 Claims, 5 Drawing Sheets

FIG. 1

SECTION A-A

ELECTROSTATIC DRIVE

TECHNICAL FIELD

The invention relates to an electrostatic drive device in which the voltage of one or more electrodes is controlled to generate electrostatic force, which produces relative movement between two or more objects to which the electrodes are secured.

BACKGROUND OF THE INVENTION

Use of electrostatic forces to control movement occurring between a pair of objects is known. One way of accomplishing this is by affixing or forming electrodes on a pair of objects, and applying voltages to the electrodes in order to generate electrostatic force. By taking into account the details of the physical connection between the objects, the voltages and resulting electrostatic force may be manipulated to control the resulting movement between the objects.

In micro electro-mechanical systems (MEMS), it is often necessary to effect very small, precise movements between objects through a range of motion. To do this, sometimes a large number of electrodes are used, with the individual electrodes being spaced closely together, say a few micrometers or less. In some cases, resolution enhancement (i.e., finer movement steps) may be had by further decreasing the pitch, or spacing, between adjacent electrodes. This is not feasible, however, where the pitch is already at or approaching the limits of what is possible with a given fabrication technique. In other cases, it may be disadvantageous to increase the electrode density, even though technically possible. For example, increased electrode density may consume extra space, increase heat output, or require undesirably complex supporting electronics.

Regardless of the size or quality of the relative movements, it is normally desirable that the movements be easy to control. Many prior systems fail in this regard. Some are difficult to control because they are not designed in a way that allows them to be easily incorporated into a closed loop control system. Other systems require use of complicated protocols or command languages to produce the desired movements. Still others require that the operator of the system have a detailed knowledge of the mechanical details of the system in order to create the necessary voltages and electrostatic forces necessary to create the relative movement.

SUMMARY OF THE INVENTION

The present invention provides an electrostatic drive having a mover with a plurality of mover electrodes operatively affixed thereto, and a stator with a plurality of stator electrodes operatively affixed thereto. The mover and stator are movable relative to one another via electrostatic force generated between the mover electrodes and the stator electrodes. The electrostatic drive includes a driver configured to drive the stator electrodes into any of a plurality of sequential voltage states, where each voltage state is defined by a combination of LO and HI voltage levels at the stator electrodes. Transition from one voltage state to a sequentially adjacent voltage state produces a step size of relative movement between the mover and stator. For each of the sequential voltage states, the driver is further configured to selectively vary voltage applied at one of the stator electrodes to an amount between the LO and the HI voltage levels, in order to produce a proportionally smaller step size and thereby increase resolution of the electrostatic drive.

DETAILED DESCRIPTION OF THE INVENTION

The present invention is directed to an electrostatic drive. The electrostatic drive embodiments described herein may be used in a variety of settings, but have proven particularly advantageous when used in very small computer storage devices and other MEMS systems. For purposes of illustration only, the electrostatic drive embodiments described below will be discussed primarily in the context of a high-density MEMS computer storage device.

Figure 1:
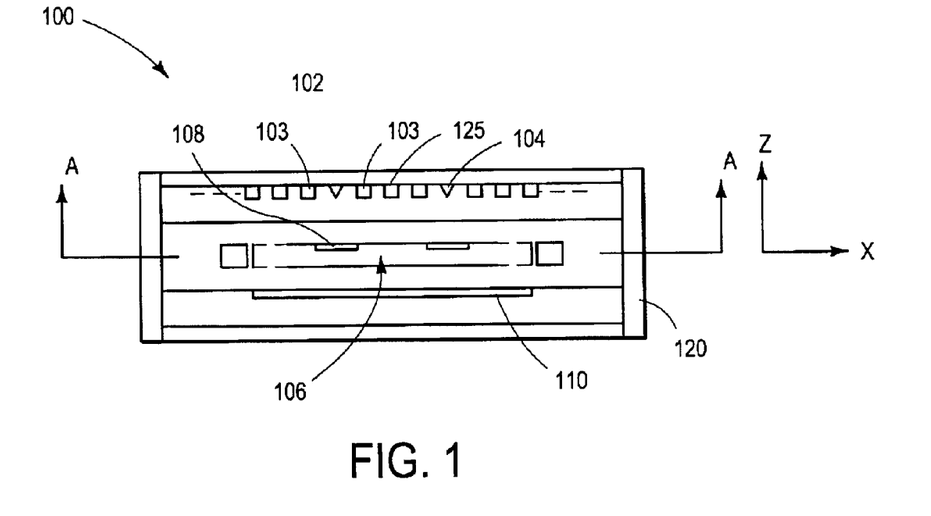
FIGS. 1–3 show different perspectives of a computer storage device with which an electrostatic drive according to the present invention may be used.
Figure 2:
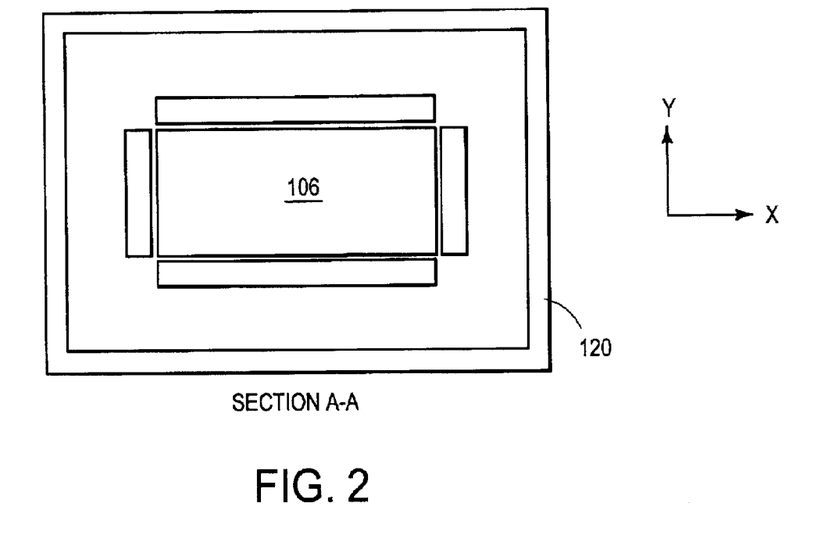

FIGS. 1 and 2 respectively show side and top cross-section views of a storage device 100, with which an electrostatic drive according to the invention may be used. Storage device 100 includes a number of field emitters, such as 102 and 104, a storage medium 106 with a number of storage areas, such as 108, and a microactuator 110, which scans (moves) the storage medium 106 with respect to the field emitters or vice versa. Storage device 100 may be configured so that each storage area is responsible for storing one bit or many bits of information.

The field emitters may be configured as point-emitters having very sharp points. For example, each field emitter may have a radius of curvature of about one nanometer to hundreds of nanometers. During operation, a preselected potential difference is applied between a field emitter and its corresponding gate, such as between emitter 102 and circular gate 103 surrounding emitter 102. Due to the sharp point of the emitter, an electron beam current is extracted from the emitter and directed with a high degree of precision towards the storage area. Depending on the distance between the emitters and storage medium 106, the type of emitters, and the spot size (bit size) required, electron optics may be desired to focus the electron beams. A voltage may also be applied to storage medium 106 to either accelerate or decelerate the field-emitted electrons or to aid in focusing the field-emitted electrons. Because the field emitters are used to access desired storage areas on the storage medium, the field emitters will also be referred to herein as access devices.

Casing 120 typically is adapted to maintain storage medium 106 in partial vacuum, such as at least $10^{-5}$ torr. Researchers have produced microfabricated field emitters in vacuum cavities using semiconductor processing techniques. See, for example, "Silicon Field Emission Transistors and Diodes," by Jones, published in IEEE Transactions on Components, Hybrids and Manufacturing Technology, 15, page 1051, 1992.

Each field emitter may correspond to one or more storage areas provided on storage medium 106. Where each field emitter is responsible for a number of storage areas, storage device 100 typically is adapted to scan or otherwise effect relative movement between casing 120 (and thus, the field emitters) and storage medium 106. For example, microactuator 110 typically is adapted to scan medium 106 to different locations, so that each field emitter is positioned above different storage areas. With such a configuration, microactuator 110 can be used to scan an array (typically two-dimensional) of field emitters over the storage medium. Because storage medium 106 moves relative to casing 120, it will at times be referred to as the "mover." Correspondingly, casing 120 and various other components that are fixed relative to the casing (e.g., the field emitters) will be at times referred to as the "stator."

The field emitters typically are configured to read and/or write information on the storage areas via electron beams they produce. Thus, field emitters suitable for use with storage device 100 must produce electron beams narrow enough to achieve the desired bit density on storage medium 106. Further, the field emitters must provide electron beams of sufficient power density to perform the desired read/write operations. A variety of methods may be used to fabricate such field emitters. For example, one method is disclosed in "Physical Properties of Thin-Film Field Emission Cathodes With Molybdenum Cones," by Spindt et al, published in the Journal of Applied Physics, Vol. 47, No. 12, December 1976. Another method is disclosed in "Fabrication and Characteristics of Si Field Emitter Arrays," by Betsui, published in Tech. Digest 4th Int. Vacuum Microelectronics Conf., Nagahama, Japan, page 26, 1991. Such emitters have been successfully employed in various applications, such as in flat panel displays.

The field emitters may be provided as a two-dimensional array (e.g., 100 by 100 emitters), with an emitter pitch of 50 micrometers in both the x- and the y-directions. Each emitter may access bits in tens of thousands to hundreds of millions of storage areas. For example, the emitters may scan over (i.e., move relative to) a storage medium that has a two dimensional array of storage areas, where the periodicity between adjacent storage areas is anywhere from a fraction of a nanometer to 100 or more nanometers, and where the operational range of the microactuator is 50 micrometers in both the x and y-directions. Also, the field emitters may be addressed simultaneously or in a multiplexed manner. Parallel addressing schemes may provide storage device 100 with significant performance enhancements in terms of access time and data rate.

Figure 3:
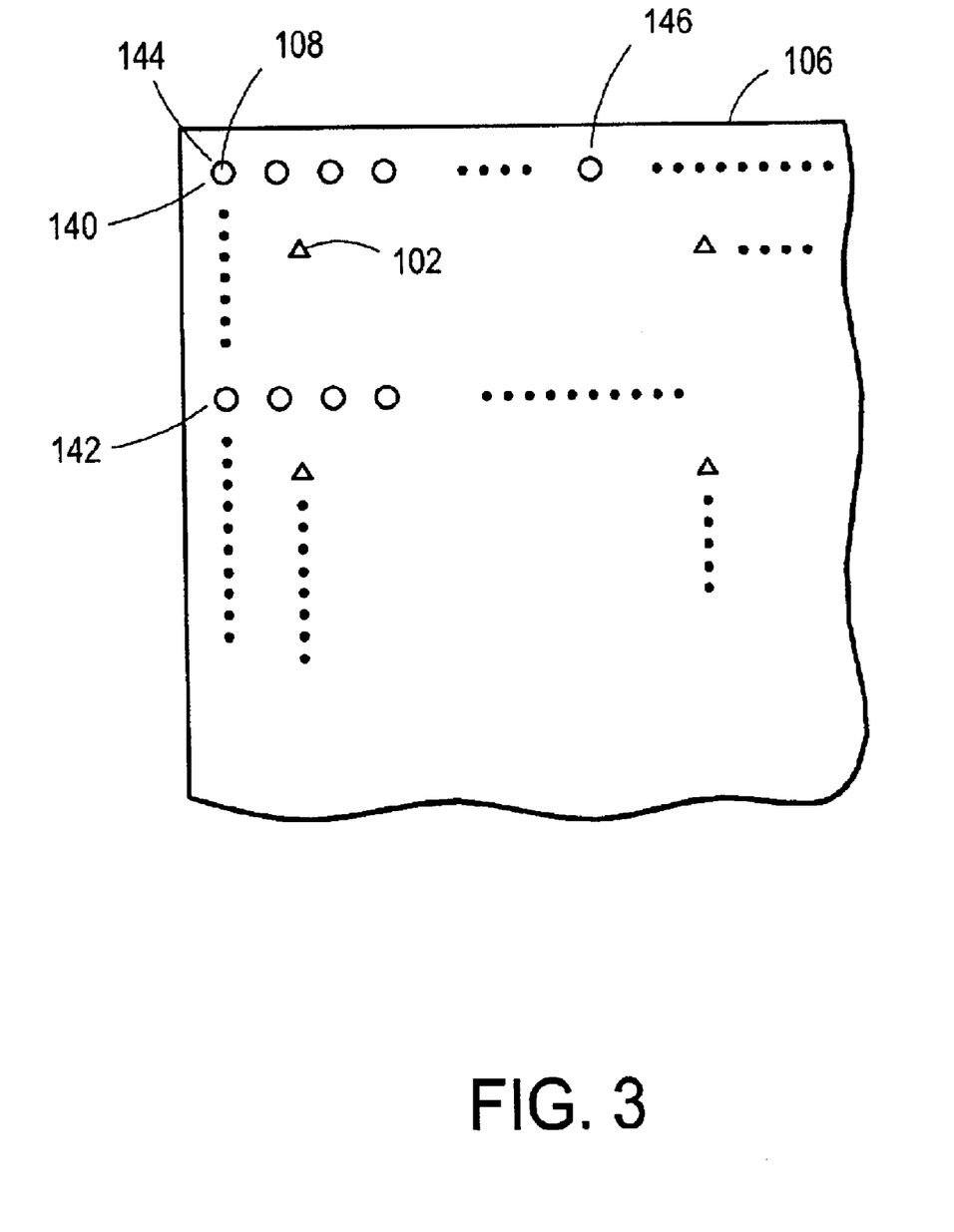

FIG. 3 is a top view of an exemplary storage medium 106, depicting a two dimensional array of storage areas and a two dimensional array of field emitters. External circuitry (not shown) is used to address the storage areas. As indicated, it will often be desirable to segment the storage medium into rows, such as row 140, where each row contains a number of storage areas, such as storage area 108. Typically, each emitter is responsible for a number of rows, but is not responsible for the entire length of those rows. For example, as depicted, emitter 102 is responsible for the storage areas within rows 140 through 142, and within columns 144 through 146.

The foregoing describes an exemplary storage device with which an electrostatic drive according to the present invention may be used. Other aspects of this type of storage device are disclosed in U.S. Pat. No. 5,557,596, the disclosure of which is incorporated herein by this reference.

Figure 4:
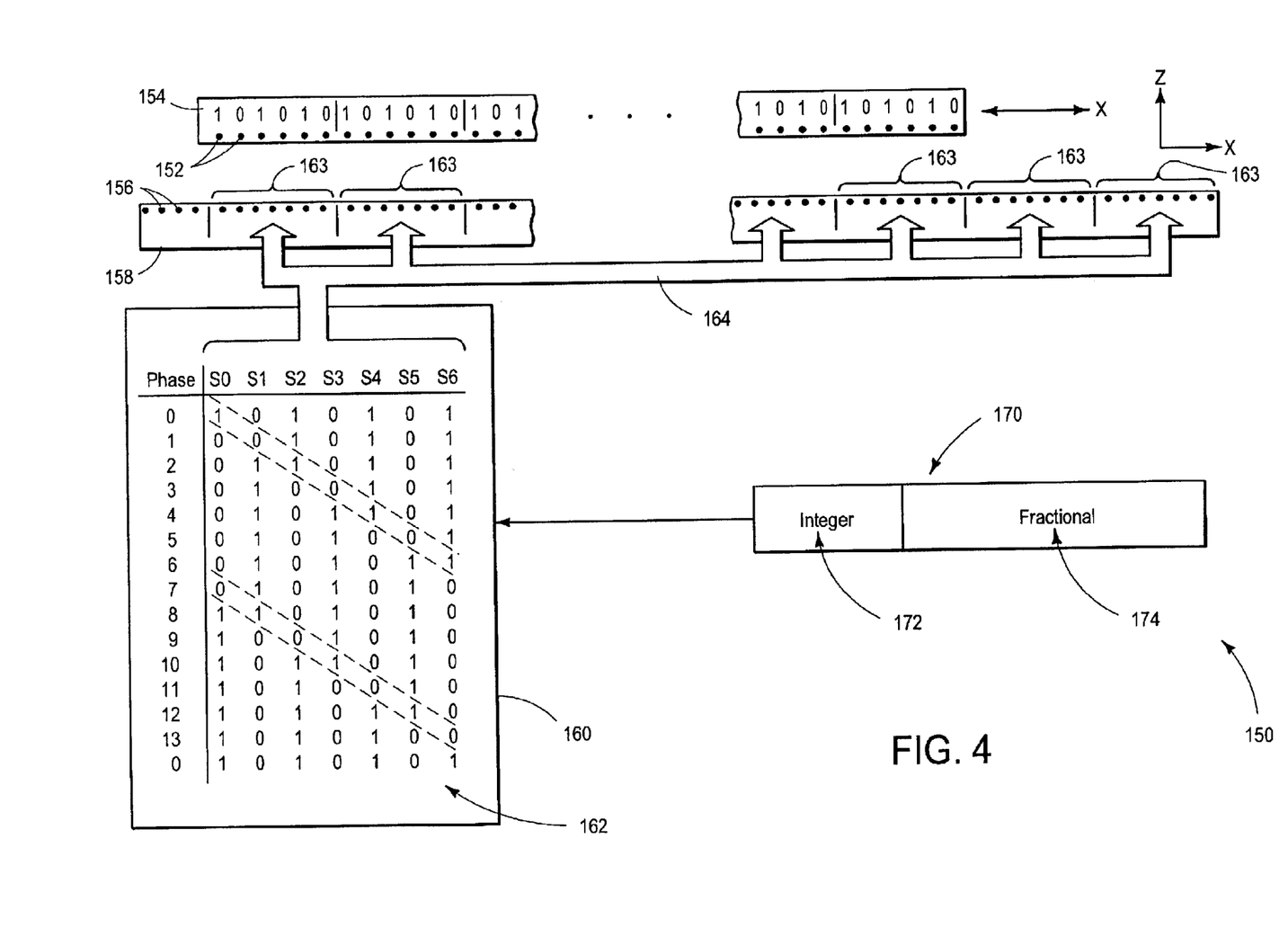
FIG. 4 is a schematic depiction of an electrostatic drive according to the present invention.

FIG. 4 depicts an electrostatic drive 150 according to the present invention, including a number of mover electrodes 152 secured to mover 154 (e.g., storage medium 106), a number of stator electrodes 156 secured to stator 158 (e.g., casing 120), and a driver 160. Typically, as indicated, both the mover electrodes and stator electrodes are disposed in a linear configuration which is parallel to the motion axis (e.g., the x-axis). Driver 160 causes voltages to arise at mover electrodes 152 and/or stator electrodes 156, which results in application of electrostatic forces between mover 154 and stator 158. Due to fringing of the electrostatic fields and the mechanical suspension used to couple the mover to the stator, the electrostatic forces cause the mover to move along the x-axis relative to the stator, as indicated. Varying the voltages applied to the electrodes produces changes in relative position of the mover and stator.

To achieve relative motion along another axis (e.g., the y-axis) or in a different direction, the depicted arrangement is reproduced for that axis or direction. For example, as indicated above, it is desirable that storage medium move in two dimensions, i.e., within the x-y plane. Accordingly, the depicted electrostatic drive system will include mover and stator electrodes along both the x- and y-axes. Those skilled in the art will appreciate that the scope of the invention includes systems capable of producing motion in multiple directions, including linear/axial motion and motion in curved directions or directions of other shapes.

Virtually any desired number of electrodes may be used, in a variety of geometrical configurations. As indicated above, where axial motion is desired, the mover and stator electrodes are normally arranged in a line parallel to the desired axis of motion. Also, it will usually be desirable to provide enough electrodes so that, over the entire desired range of motion, at least some of the mover and stator electrodes are close enough to generate enough electrostatic force to cause relative motion between the objects.

For example, referring specifically to FIG. 4, mover electrodes 152 are provided at a uniform pitch, or spacing, along substantially the entire available length of the downward facing surface of mover 154. Voltage at each mover electrode 152 is indicated as being either 1 or 0, where 1 represents that the electrode is at a HI voltage level Ve, and where 0 represents that the electrode is at a LO voltage level, typically ground. As indicated, voltages on the mover electrodes alternate between 1 and 0 for adjacent electrodes. A Ve of 40 volts has proven suitable, though other voltage levels may be used as appropriate to a particular implementation. In the depicted configuration, the voltages at the mover electrodes do not change. Rather, as will be explained, the voltages on the stator electrodes are varied to produce the varying electrostatic forces used to move the mover relative to the stator.

Still referring to FIG. 4, stator electrodes 156 are similarly arranged in linear fashion along a surface of stator 158 that faces mover 154. Like the mover electrodes, stator electrodes 156 typically are uniformly spaced from each other, that is, they have a uniform pitch. However, as will be seen, the stator electrode spacing may be different from the mover electrode spacing.

As indicated, stator electrodes 156 are provided in a number of groups 163 that each contain seven electrodes S0 through S6. Driver 160 is configured to drive the electrodes of each stator electrode group through a number of different voltage states, or phases. These phases are represented in table 162, which is a schematic representation of the voltages that may be applied to the stator electrodes to produce the desired relative movement. Each row within table 162 defines a particular phase and indicates the voltage level applied at stator electrodes S0 through S6 for that phase. For example, in phase 0, the HI voltage level (e.g., Ve, which is represented in the table by a 1) is applied at the S0 stator electrode, the LO voltage level (e.g., ground) is applied at the S1 stator electrode, and so on. As indicated, there are fourteen different phases of the stator electrodes; the phases are labeled 0 through 13 in the table. Transition from one phase to a sequentially adjacent phase (i.e., increasing or decreasing by one phase) causes mover 154 to move relative to stator 158 by a fixed step size.

As indicated via bus-type coupling 164, the voltage pattern of ones and zeros defined by a given phase typically is applied to each group of seven stator electrodes that are positioned on the stator. Accordingly, it should be appreciated that the stator electrodes are both logically and physically grouped. The stator electrodes are physically grouped because each group includes seven stator electrodes that are physically adjacent one another on the stator. They are logically grouped because the group of seven is the smallest grouping of stator electrodes for which the electrical activity repeats identically over the entire length of the electrode surface. Each group receives the same set of signals from driver 160.

For each grouping 163 of seven stator electrodes, there are six mover electrodes occupying the same length on the mover, as indicated. Thus, the pitch of the stator electrodes is 6/7 that of the mover electrodes. Other groupings and pitch ratios may be used. For example, the system may be configured so that the stator electrodes are organized into logical groupings of more or less than seven electrodes. The ratio of the pitch of the stator electrodes to the mover electrodes may be 1:1 or another value other than the 7:6 ratio of the depicted example.

Though many configurations are possible, it will often be desirable, as in the depicted example, that the stator-mover pitch ratio be (n):(n−1), where n is the number of stator electrodes per logical/physical group. In general, the mover step size per phase advancement is a function of the motor electrode geometry and the relative force constants of the motor spring and electrostatic drive. It will be appreciated that, for the above stator-mover pitch ratio of (n):(n−1), each transition to an adjacent phase results in a fixed step size equal to the pitch of the mover electrodes divided by the number of stator electrodes per logical/physical group. This assumes that the electrostatic force produced between the electrodes is much larger than the motor spring force. For example, assuming a mover electrode pitch of 1.4 micrometers and seven stator electrodes per group, the step size will be 0.2 micrometers. Thus, referring to table 162, changing the stator electrode voltages from phase 5 to either phase 4 or 6 will result in 0.2 micrometers of relative x-axis displacement between mover 154 and stator 158. Indeed, in this example, starting from any of the 14 different phases shown in table 162, incrementing or decrementing the phase by one will cause 0.2 micrometers of displacement.

In many cases, the step size produced by the above electrode geometry is adequate. In others, it is desirable to increase the resolution of the mover (e.g., by decreasing the step size). For example, in one implementation of the storage device described with reference to FIGS. 1–3, the data tracks on storage medium are 40 nanometers wide, ⅕ of the 0.2 micrometer step size in the above example. To accurately access data tracks of this size, a much higher mover resolution than 0.2 micrometers is needed. Positioning at higher resolutions permits effective use of closed-loop servo control, reduces quantization errors, and permits operation of the storage device in track offset modes, as is often required for data recovery operations.

Referring still to FIG. 4, a system and method for increasing mover resolution is depicted. Generally, the step size is reduced by proportional control of the voltage at one or more of stator electrodes 156. It has been found that varying the voltage of one of the stator electrodes between the LO and HI voltage signal (e.g., between 0 and Ve) results in a proportional linear scaling of the step size. For example, assume that for phase 1 (levels on stator electrodes S0 through S6={0 0 1 0 1 0 1}, as seen in table 162), the mover is at x=0 micrometers. Switching to phase 2 (S0 through S6={0 1 1 0 1 0 1}) would result in the mover advancing to x=0.2 micrometers, assuming the step size discussed above. Instead of advancing to phase 2, the voltage on the second stator electrode (S1) can be proportionally increased from 0 to 1, while leaving all of the other stator electrodes at their phase 1 values, to achieve finer resolution position control. Thus, 10% of the fixed step (x=0.02 micrometers) could be achieved with the stator electrodes set at S0 through S6={0 0.1 1 0 1 0 1}. This may be thought of as a "modification" of phase 1.

This result may be extended more generally to the depicted system, where increased resolution is achieved via proportional control of one of the stator electrodes in each stator electrode group. As indicated by the dashed lines in table 162, the proportional electrode switches with each phase advancement. S0 is proportionally controlled for phase 0, S1 for phase 1, S2 for phase 2, and so on. Generally, as indicated in table 162, the proportional electrode is equal to (phase mod 7). Thus, once the phase is determined, the stator electrode to be controlled may be easily determined using a hardware or software implementation of the mod 7 logic.

Figure 5:
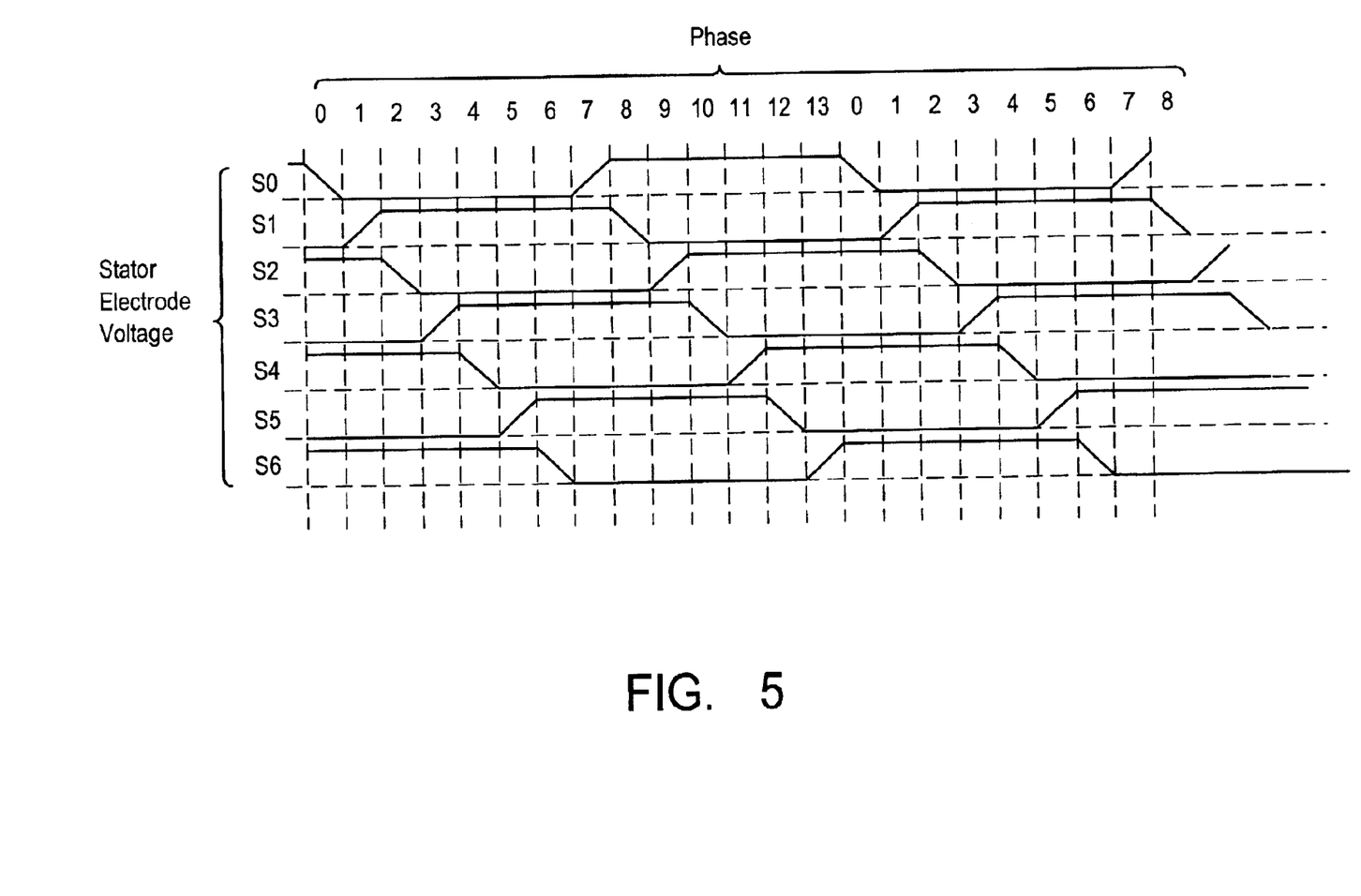
FIG. 5 is an exemplary waveform diagram depicting signal states that may exist at the various stator electrodes shown in FIG. 4.

FIG. 5 shows voltage waveforms for each of the seven stator electrodes in a particular stator electrode group. As the system cycles through each of the 14 different phases, each stator electrode is at the LO level (0) for six consecutive phases, transitions through one phase, and then is at the HI level (1) for six consecutive phases. The depicted waveforms show linear, ramped transitions between the LO and HI levels, indicating that the given stator electrode is proportionally controlled during the phase in which the ramped transition occurs.

For example, in phase 9, the S2 electrode is proportionally controlled, and transitions from LO to HI. During that phase, S2 is proportionally set to some scaled value between the LO and HI level in order to achieve the desired amount of displacement, while all of the other electrodes remain at the HI and LO levels specified by phase 9. Again, this may be thought of as a modification of phase 9. When S2 is set at 0 (LO), phase 9 is unmodified from the voltage state shown in table 162 of FIG. 4. As phase 9 is modified by increasing the voltage on S2, a proportional amount of displacement occurs, that is, proportional to the fixed step size that would occur by a simple transition from phase 9 to phase 10. As the voltage on S2 approaches 1 (HI), an amount of displacement has occurred which is nearly equal to that which would occur if the phase were simply switched to phase 10. If further displacement is desired, the electrode voltages are switched to the levels specified by phase 10, and the proportional electrode switches to S3, which is then proportionally controlled to achieve the desired displacement.

Thus, it will be appreciated that at least two pieces of information are necessary to position the mover. The first is the phase. As discussed above, the phase determines which of the electrodes is to be proportionally controlled, and whether a HI or a LO level is to be applied to the remaining non-proportional electrodes. The second piece of information is the voltage that is to be applied to the proportional electrode in order to produce the desired mover displacement.

Both of these items may be incorporated into a multi-bit digital command, such as exemplary control command 170, which includes an integer value 172 and a fractional value 174. Integer value 172 specifies the number of phase steps (the displacement resulting from a phase advancement) the mover is to move from some reference point. In the above example, each phase step provided 0.2 micrometers of displacement. The depicted integer value 172 is an 8-bit number, thus accommodating up to 256 phase steps. This would provide roughly a 50 micrometer operative range of relative displacement, assuming the 0.2 micrometer step size discussed above. This range has proved useful for the exemplary storage device discussed above. The bit-size of the integer value field can of course be modified to accommodate any desired number of phase steps.

Integer value 172 typically is processed to yield a 4-bit value which specifies the phase of the stator electrodes. This may be accomplished by converting integer value 172 to a base 14 value using a hardware- or software-implemented mod 14 counter. Alternatively, the integer value may be directly converted to the phase via one of the following base 14 conversions: (1) phase=iv−INT(iv/14)*14, where iv is the integer value; or (2) phase=iv−INT((iv*64+iv*8+iv+72)/1024)*14.

To move the mover a desired number of phase steps, driver 160 typically cycles stator electrodes 156 through all of the intervening sequential phases. By way of illustration, assume that the mover is at x=0 when integer value 172 is 0. When integer value 172 is at 50, the mover has moved to x=50*(0.2)=10 micrometers. Also, at this point (i.e., x=10 micrometers), the stator electrodes are in phase 8 (S0 through S6={1 1 0 1 0 1 0}). To move the mover another 10 micrometers to x=20 micrometers, an additional 50 phase steps are needed. Thus, starting with phase 8, the phase is increased 50 times (from phase 8, to phase 9, 10, 11, 12, 13, 0, 1, etc.) to produce the necessary electrostatic forces to effect the desired motion. At the $100^{th}$ step, the electrodes are in phase 2.

Fractional value 174 specifies the fractional value of a given phase step, and is used to scale the voltage which is applied to the proportionally controlled electrode. Another way of thinking about fractional value 174, is that it is a specification of how much a given phase is modified from the unmodified representation depicted in table 162. In depicted control command 170, a 12-bit fractional value is used, yielding an ultimate step size that is 4096 times smaller than the basic step size produced by a phase advancement. Accordingly, using the 0.2 micrometer phase step of the above examples, the 12-bit fractional value provides mover resolution to 0.05 nanometers (0.2 micrometers/4096), or 1/20 of a nanometer.

It will be appreciated that the proportion control system and control command described above provide a number of advantages. One such advantage is ease of operation. In a sense, the described system acts as a digital to analog converter, which receives a digital input (e.g., control command 170) and produces an analog output (e.g., physical displacement of mover 154) in response. The amount of physical displacement is easily controlled, because it varies linearly with the value of the digital input. The control command allows the system programmer/designer to easily program motion control without knowledge of the underlying mechanical details of the movable system. In addition, the described proportional control scheme enhances movement resolution, without requiring additional electrodes or complex supporting electronics.

Figure 6:
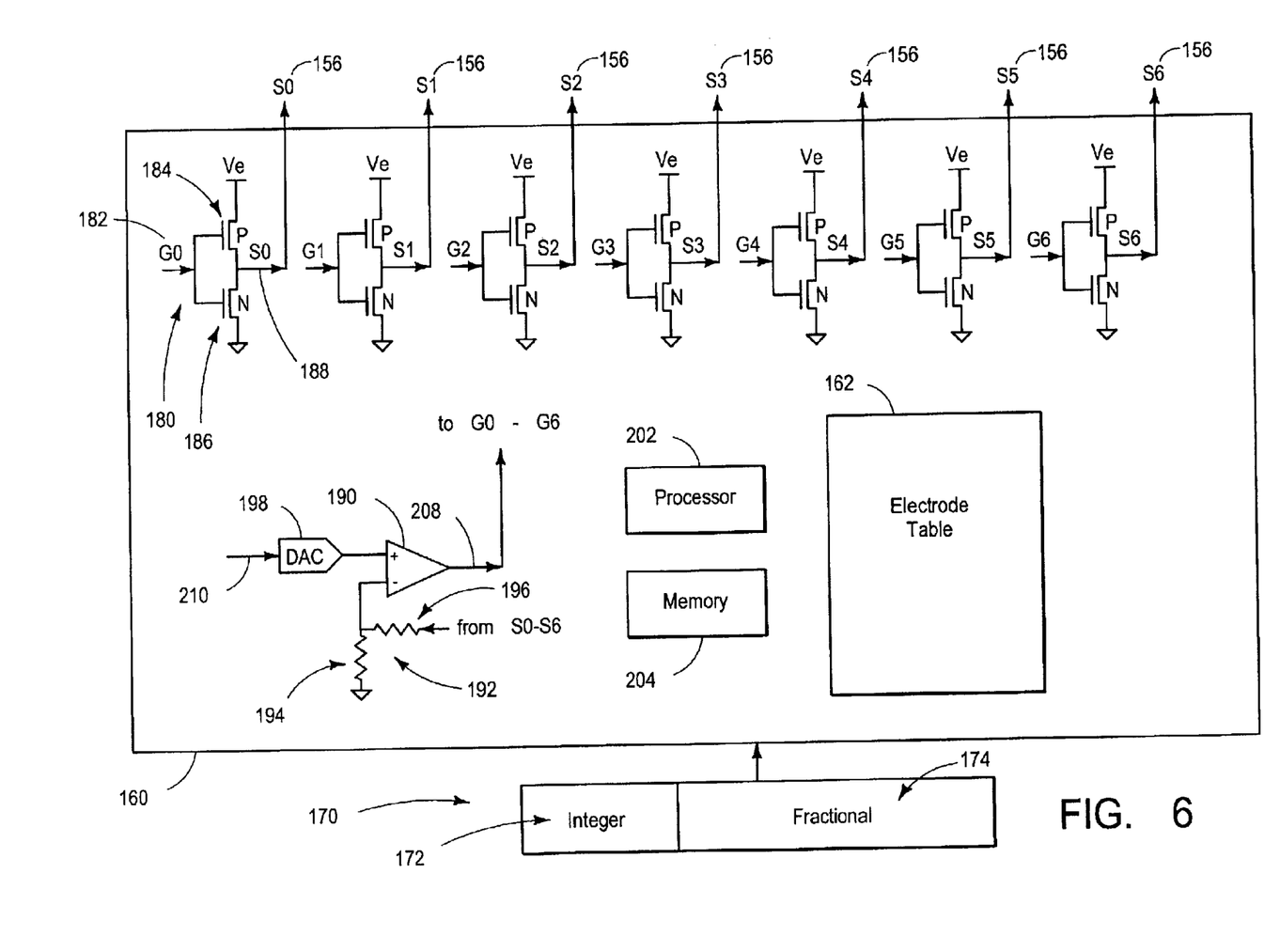
FIG. 6 is a schematic depiction of a driver system that may be used to apply signals to the stator electrodes shown in FIG. 4.

FIG. 6 depicts various components of driver 160 that may be used to produce the desired voltages on stator electrodes 156. A half bridge 180 is provided for each of the stator electrodes. Each half bridge includes an input gate 182 coupled to a P-FET 184 and an N-FET 186, with accompanying connections to ground and Ve, and an output pin 188 for the stator electrode voltage. A regulating op-amp 190 is provided to achieve proportional control of one of the electrodes (e.g., the proportionally controlled electrode specified by the dashed diagonal lines in table 162). A voltage divider 192 (resistors 194 and 196) and a D-A converter 198 are coupled to the inputs of the op-amp. Electrode table 162 is the same table depicted in FIG. 4, and contains the voltage levels to be applied to the various stator electrodes. Driver 160 may further include a processor 202, memory 204, and other hardware and software components configured to perform the functions described herein.

As indicated, control command 170 is applied to driver 160 as an input. As previously described, integer value 172 specifies a number of phase steps and the phase(s) in which the stator electrodes must be placed to achieve the commanded movement. Based on the phase, the voltages to be applied to the non-proportional stator electrodes are known. Typically, these voltages are applied based on stored values, such as the values shown in table 162 (FIG. 4) for the various phases. The phase selection causes inputs to the non-proportional electrodes to be switched, such that the stored values are supplied as inputs to the half bridges which control the electrode outputs. Specifically, either a 1 or 0 is applied to input gate 182 of the half bridge for each of the non-proportional electrodes. Where a 1 is applied, P-FET 184 saturates, tying electrode output 188 to Ve. If a 0 is applied to the gate, N-FET 186 saturates, grounding the electrode output.

The value of the phase also determines the switching of input signals to the proportional electrode. Specifically, the phase determines which of the half bridges will be selectively coupled with regulating op-amp 190, in order to produce an output between ground and Ve at the output of the half bridge. Based on the phase selection, input gate 182 of the selected half bridge is coupled with the output 208 of op-amp 190. Output 188 of the selected half bridge is coupled to the input side of op-amp 190 through resistor 196.

The desired proportional voltage is produced at the output of the selected half bridge by supplying D-A converter 198 with input 210. Input 210 is set at either: (1) fv/4096, where fv is fractional value 174 (assuming fractional value 174 is a 12-bit number), or (2) 1−fv/4096. These two cases respectively reflect that displacement is sometimes incremented by increasing voltage on the proportional electrode (case 1), and at other times it is incremented by decreasing voltage on the proportional electrode (case 2). Referring to the voltage waveforms of FIG. 5, where the transitional slope is positive (when the FIG. 4 table entry for the electrode is a 0), D-A converter 198 is provided with fv/4096 (case 1). Where the transitional slope is negative (when the FIG. 4 table entry for the electrode is a 1), D-A converter 198 is provided with 1−fv/4096 (case 2).

The resulting analog output from D-A converter 198 is applied as an input to op-amp 190 via the positive terminal, along with the voltage-divided output from the selected half bridge, which is provided via the negative terminal. Application of these inputs eventually results in op-amp 190 reaching an equilibrium, at which point the desired proportion voltage is output from the selected half bridge and applied to the given stator electrode.

It is believed that the disclosure set forth above encompasses multiple distinct inventions with independent utility.

While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. An electrostatic drive, comprising:
   a mover and a plurality of mover electrodes operatively affixed thereto;
   a stator and a plurality of stator electrodes operatively affixed thereto, the mover and stator being movable relative to one another via electrostatic force generated between the mover electrodes and the stator electrodes; and
   a driver configured to drive the stator electrodes into any of a plurality of sequential voltage states, each voltage state being defined by a combination of LO and HI voltage levels existing at the stator electrodes, where transition from one voltage state to a sequentially adjacent voltage state produces a step size of relative movement between the mover and stator,
   where, for each of the voltage states, the driver is further configured to selectively vary voltage applied at one of the stator electrodes to an amount between the LO and the HI voltage levels, in order to produce a proportionally smaller step size.

2. The electrostatic drive of claim 1, where the driver is configured to produce relative movement between the mover and stator based on a digital control command, the driver being further configured to produce relative movement between the mover and stator that varies linearly with the digital control command.

3. The electrostatic drive of claim 2, where the digital control command includes specification of one of the plurality of sequential voltage states.

4. The electrostatic drive of claim 2, where the digital control command includes specification of one or more of the stator electrodes that are to receive a varied voltage which is between the LO and the HI voltage levels.

5. The electrostatic drive of claim 4, where the digital control command includes, for the one or more stator electrodes that are to receive a varied voltage which is between the LO and the HI voltage levels, specification of the degree to which such varied voltage varies from either the HI voltage level or the LO voltage level.

6. The electrostatic drive of claim 1, where the stator electrodes are arranged sequentially on the stator in a plurality of groupings.

7. The electrostatic drive of claim 6, where each grouping includes 6 stator electrodes.

8. The electrostatic drive of claim 1, where the mover electrodes are spaced uniformly from each other, and where the stator electrodes are spaced uniformly from each other.

9. The electrostatic drive of claim 8, where spacing between the mover electrodes differs from spacing between the stator electrodes.

10. The electrostatic drive of claim 8, where the spacing between stator electrodes is (N−1)/N times the spacing between the mover electrodes.

11. The electrostatic drive of claim 10, where N=7.

12. The electrostatic drive of claim 1, where the mover electrodes and stator electrodes are disposed respectively on a pair of generally planar surfaces of the mover and stator that face each other, the electrostatic drive being configured so that the electrostatic forces generated between the mover and stator electrodes produce fringing effects which cause the generally planar surfaces to move parallel to one another.

13. An electrostatic drive, comprising:
    a pair of objects configured to move relative to one another;
    a plurality of electrodes operatively secured to one of the objects, the electrodes being configured so that application of voltages to the electrodes creates electrostatic forces which effect relative movement of the objects; and
    a driver configured to selectively apply a voltage level to each of the electrodes, the voltage level being selected from the group consisting of a HI level, a LO level, and a scalable level from a range including levels between the HI and LO level, where
    the HI level or the LO level is applied to at least one of the electrodes; and
    the scalable level is applied to at least one of the other electrodes, where the driver is configured so that varying the scalable level between the HI and LO levels proportionally adjusts the relative movement occurring between the objects.

14. The electrostatic drive of claim 13, where the driver is configured to produce relative movement between the objects based on a digital control command.

15. The electrostatic drive of claim 14, where the driver is configured to produce an amount of relative movement between the objects that varies linearly in proportion to the digital control command.

16. The electrostatic drive of claim 14, where the digital control command includes specification of the voltage levels to be applied to each of the electrodes.

17. The electrostatic drive of claim 14, where the digital control command includes specification of a particular one of the electrodes that is to receive the scalable voltage level.

18. The electrostatic drive of claim 17, where the digital control command includes, for the particular one of the electrodes that is to receive the scalable voltage level, the value of such scalable voltage level.

19. The electrostatic drive of claim 14, where the driver is configured to produce an amount of relative movement between the objects that varies linearly in proportion to a digital control command.

20. The electrostatic drive of claim 13, where the electrodes are disposed upon a generally planar surface of one of the objects, the electrostatic drive being configured such that selective application of voltage levels by the driver to the electrodes causes relative movement between the objects in a direction that is parallel to the surface upon which the electrodes are disposed.

21. The electrostatic drive of claim 13, where one of the objects is a computer storage medium, and where the other of the objects includes an access device for accessing storage locations on the computer storage medium, the electrostatic drive being configured to produce relative movement between the computer storage medium and access device to permit selective access to desired storage locations on the computer storage medium.

22. An electrostatically-driven computer storage device, comprising:
- a storage medium and a plurality of storage medium electrodes operatively affixed thereto;
- an access device movably coupled with the storage medium, the access device being configured to access storage locations on the storage medium;
- a plurality of access device electrodes that are fixed relative to the access device, the storage medium and access device being movable relative to one another via electrostatic force generated between the storage medium electrodes and the access device electrodes; and
- a driver configured to drive the access device electrodes into any of a plurality of sequential voltage states, each voltage state being defined by a combination of LO and HI voltage levels existing at the access device electrodes, where transition from one voltage state to a sequentially adjacent voltage state produces a step size of relative movement between the storage medium and the access device, where, for each of the voltage states, the driver is further configured to selectively vary voltage applied at one of the access device electrodes to an amount between the LO and the HI voltage levels, in order to produce a proportionally smaller step size and thereby increase resolution of the relative movement occurring between the storage medium and access device.

* * * * *